(12) United States Patent
Klumpp et al.

(10) Patent No.: US 6,317,056 B1
(45) Date of Patent: Nov. 13, 2001

(54) CIRCUIT FOR INTRINSICALLY SAFE DETECTION OF THE BINARY SIGNALS OF A TRANSMITTER

(75) Inventors: Wolfgang Klumpp, Achern (DE); Francis Morio, Dieffenbach/Woerth (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/242,854

(22) PCT Filed: Jul. 30, 1997

(86) PCT No.: PCT/DE97/01617

§ 371 Date: May 19, 1999

§ 102(e) Date: May 19, 1999

(87) PCT Pub. No.: WO98/08058

PCT Pub. Date: Feb. 26, 1998

(30) Foreign Application Priority Data

Aug. 23, 1996 (DE) .............................. 196 34 153

(51) Int. Cl.$^7$ ................................. G08C 17/00
(52) U.S. Cl. ............... 340/870.28; 340/661; 324/537; 361/86; 361/87; 361/42

(58) Field of Search ............... 340/870.28, 661; 361/86, 87, 42; 324/542, 537

(56) References Cited

U.S. PATENT DOCUMENTS

| | | | | |
|---|---|---|---|---|
| 5,287,107 | * | 2/1994 | Gampell | 341/137 |
| 5,583,731 | * | 12/1996 | Pergent | 340/661 |
| 5,818,216 | * | 10/1998 | MacDonald | 324/96 |

* cited by examiner

Primary Examiner—Brian Zimmerman
Assistant Examiner—Albert K. Wong
(74) Attorney, Agent, or Firm—Staas & Halsey LLP

(57) ABSTRACT

The intrinsically safe detection of binary signals of a sensor with a variable internal resistance is achieved by connecting the sensor to the voltage output of a d.c. voltage source via a shunt. To the voltage output is attached a multistage voltage divider with voltage comparators each being connected to its voltage taps by one input terminal each and with the other input terminals of the voltage comparators being connected to the terminal (26) of the shunt attached to the sensor. Optocouplers are provided downstream from the voltage comparators for transmitting the comparison results of the voltage comparators to an analysis unit (30).

4 Claims, 1 Drawing Sheet

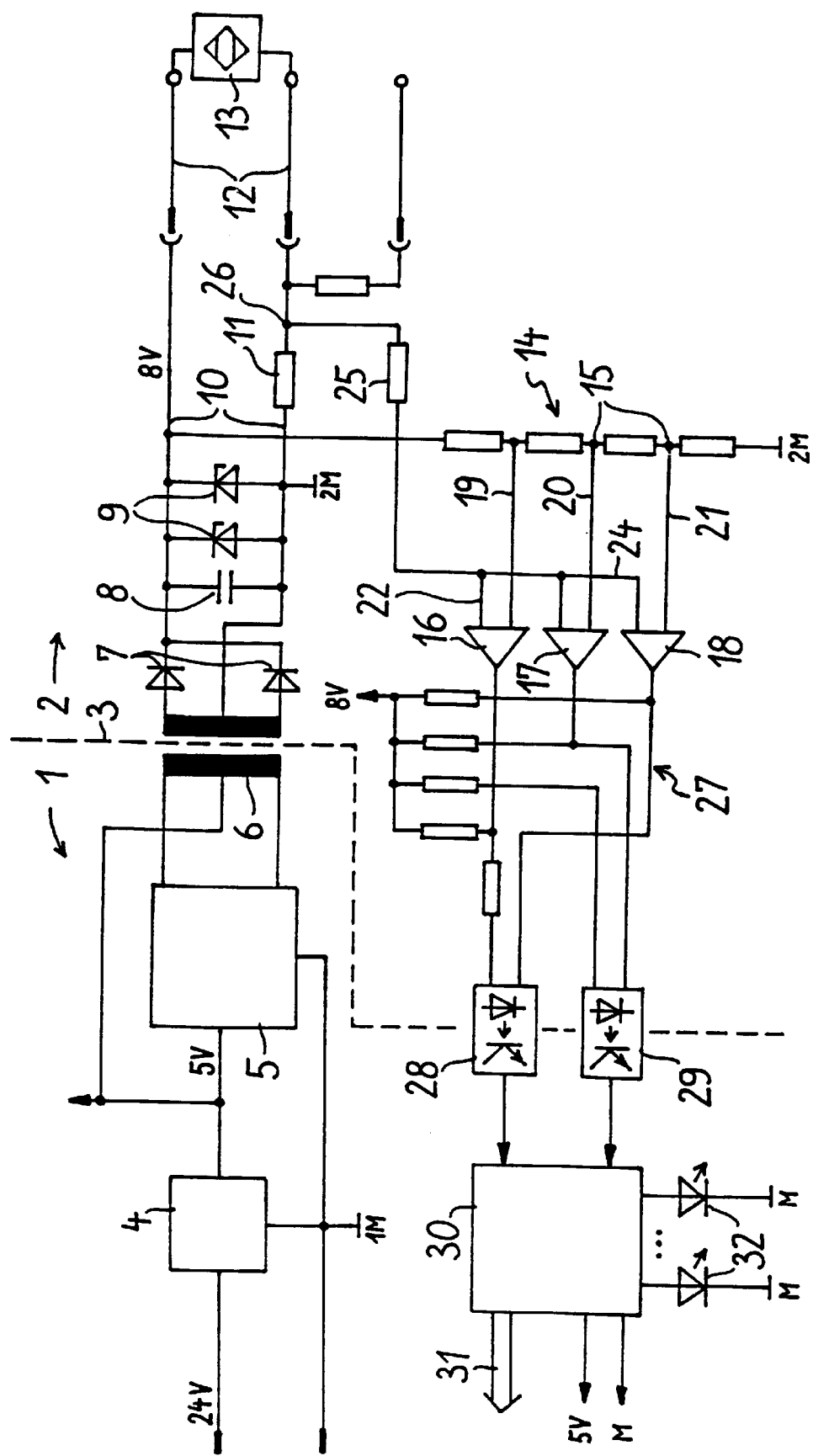

CIRCUIT FOR INTRINSICALLY SAFE DETECTION OF THE BINARY SIGNALS OF A TRANSMITTER

FIELD OF THE INVENTION

The present invention relates to a circuit arrangement for the intrinsically safe detection of binary signals of a sensor.

Background Information

In accordance with DIN 19234 NAMUR, sensors, such as position sensors, are commonly used in areas subject to explosion hazard. By changing their internal resistance, these sensors generate binary signals which can be detected as different currents when a constant d.c. supply voltage is applied to the sensor.

SUMMARY

An object of the present invention is to allow a line interruption or short-circuit on the sensor side to be detected in addition to the intrinsically safe detection of binary signals.

Using voltage comparators which compare the current flowing through the measuring shunt to different constant partial voltages at the voltage divider, it is possible to define different current ranges which, in addition to the two binary states of the binary sensor signal, also identify a line interruption and a short-circuit on the sensor side. The comparison results supplied by the voltage comparators are advantageously transmitted to the analysis unit via optocouplers in order to provide electrical isolation between the sensor and analysis sides. For the same reason, a power supply unit that is used to supply power to the sensor contains a transformer. The number of optocouplers required can be reduced using a logic circuit, located downstream from the voltage comparators, which converts the possible combinations of comparison results of the voltage comparators to a minimum number of binary control signals needed for the optocouplers.

BRIEF DESCRIPTION OF THE DRAWING

The FIGURE illustrates one example embodiment of a circuit arrangement in accordance with the present invention.

DETAILED DESCRIPTION

The circuit arrangement illustrated in the FIGURE is divided into a power supply and analysis side 1 and a sensor side 2 which are separated from each other by a potential barrier 3. On power supply and analysis side 1, a constant voltage of approximately 5 V is generated from a load voltage of, for example, 24 V, using a preregulator 4, and converted, via a voltage chopper stage 5 with a transformer 6, rectifier 7, smoothing capacitor 8, and Zener barrier 9 on its output side, to a constant d.c. supply voltage of approximately 8.2 V, which is provided to a voltage output 10. A sensor 13 which generates binary signals in the form of changes in its power consumption by changing its internal resistance is connected to voltage output 10 via a shunt 11 and a two-wire line 12. A voltage divider 14, which includes four voltage divider resistors, is connected to voltage output 10, with three voltage comparators 16, 17, and 18 being attached by one of their two input terminals 19, 20, and 21 to the three voltage taps 15 of this voltage divider 14. The other input terminals 22, 23, and 24 of voltage comparators 16, 17, and 18 are connected, via a common resistor 25, to terminal 26 of shunt 11 attached to sensor 13.

Voltage comparators 16, 17, and 18 compare the voltage drop across shunt 11 produced by the current flowing through sensor 13 to the constant partial voltages at voltage taps 15 of voltage divider 14 and generate an output signal of "one" or "zero" as the comparison result, depending on whether the voltage drop at shunt 11 is greater or less than the partial voltage. If two-wire line 12 is interrupted, no current flows through sensor 13, and all three voltage comparators 16, 17, and 18 each generate an output status of "zero". If sensor 13 generates a binary status of "off", a current which places voltage comparator 18 in the "one" output state and the other two voltage comparators 16 and 17 in the "zero" output state flows through shunt 11. When sensor 13 is in the binary state of "on", a current which places the two voltage comparators 17 and 18 in the "one" output state and voltage comparator 16 in the "zero" output state flows through shunt 11. If a short circuit occurs on the sensor side, the current flowing through shunt 11 is so high that all voltage comparators 16, 17, and 18 are placed in the "one" output state.

These four possible combinations of comparison results, i.e. the output states of voltage comparators 16, 17, and 18, are a converted, in a logic circuit 27, to two binary control signals for two downstream optocouplers 28, 29. In the embodiment illustrated, voltage comparators 16, 17, 18 have open-collector outputs which are linked to each other and to optocouplers 28, 29 in such a way that, when sensor 13 is in proper working order, they activate optocoupler 28 and, when sensor 13 is in the binary state of "on", they also activate optocoupler 29; and if a short-circuit occurs on the sensor side, only optocoupler 29 is activated, and if the two-wire line is interrupted, neither optocoupler 28 nor optocoupler 29 is activated. The comparison results of voltage comparators 16, 17, and 18 transmitted via logic circuit 27 and optocouplers 28, 29 are analyzed in an analysis unit 30, e.g. a microprocessor system, on power supply and analysis side 1 of the circuit, transmitted to a system bus 31, and possibly displayed by light-emitting diodes 32.

What is claimed is:

1. A circuit arrangement for an intrinsically safe detection of binary signals of a sensor, the sensor having a variable internal resistance, comprising:

a d.c. voltage source generating a constant supply voltage and having a voltage output, the sensor coupled to the voltage output via a shunt;

a multistage voltage divider coupled to the voltage output;

voltage comparators, a first respective input of each of the voltage comparators being coupled to a respective tap of the multistage voltage divider, a second respective input of each of the voltage comparators being coupled to a terminal of the shunt, the terminal of the shunt being connected to the sensor; and optocouplers positioned downstream from the voltage comparators, the optocouplers transmitting comparison results from the voltage comparators to an analysis unit.

2. The circuit arrangement according to claim 1, wherein the d.c. voltage source includes a power supply unit with a transformer for electrical isolation.

3. The circuit arrangement according to claim 1, wherein the voltage comparators include three voltage comparators and the multistage voltage divider has three taps.

4. The circuit arrangement according to claim 3, wherein the optocouplers include two optocouplers, the circuit arrangement further comprising:

a logic circuit positioned between the voltage comparators and the optocouplers, the logic circuit converting possible combinations of the comparison results from the voltage comparators to two binary control signals for the optocouplers.

* * * * *